United States Patent Office 3,231,132
Patented Jan. 25, 1966

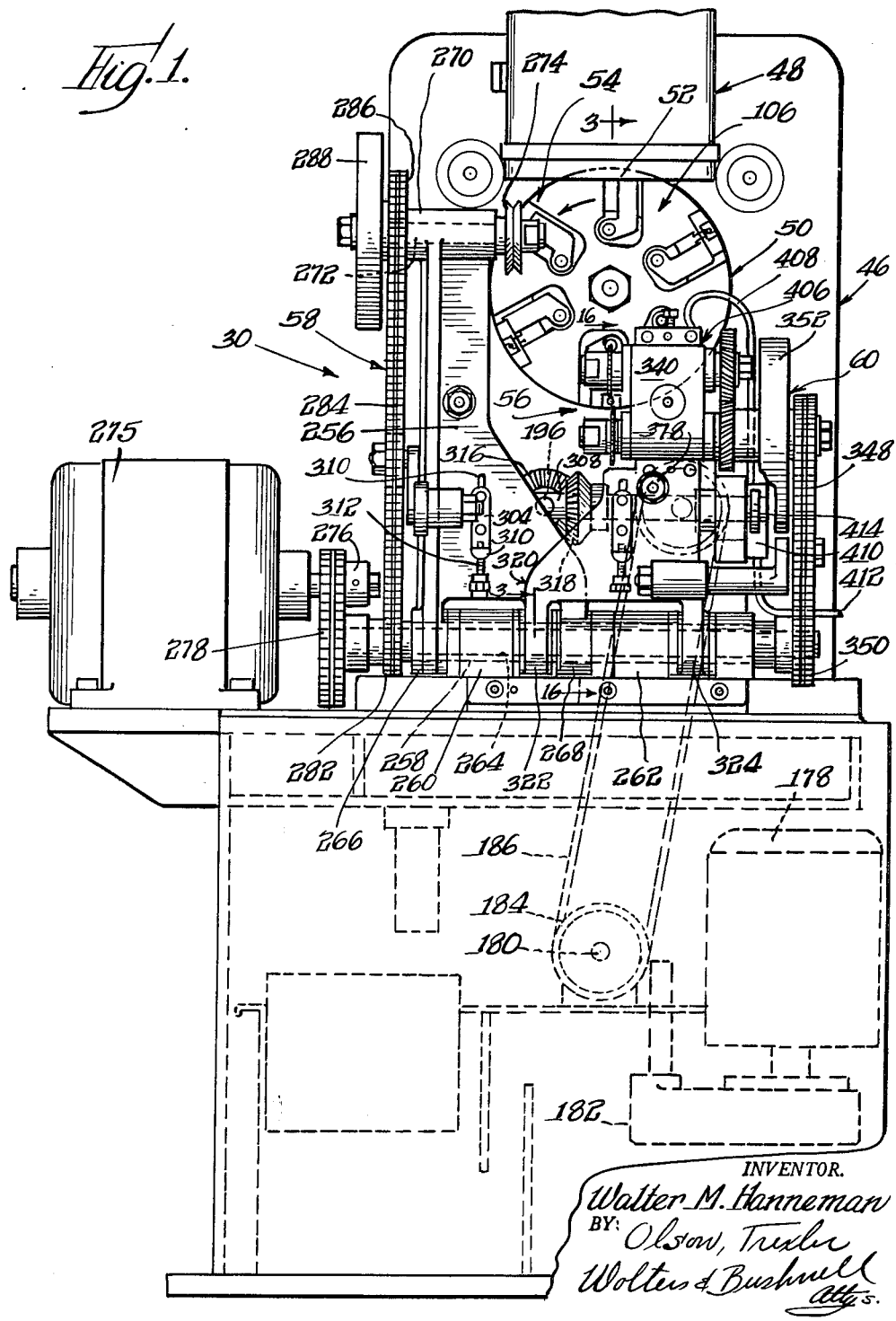

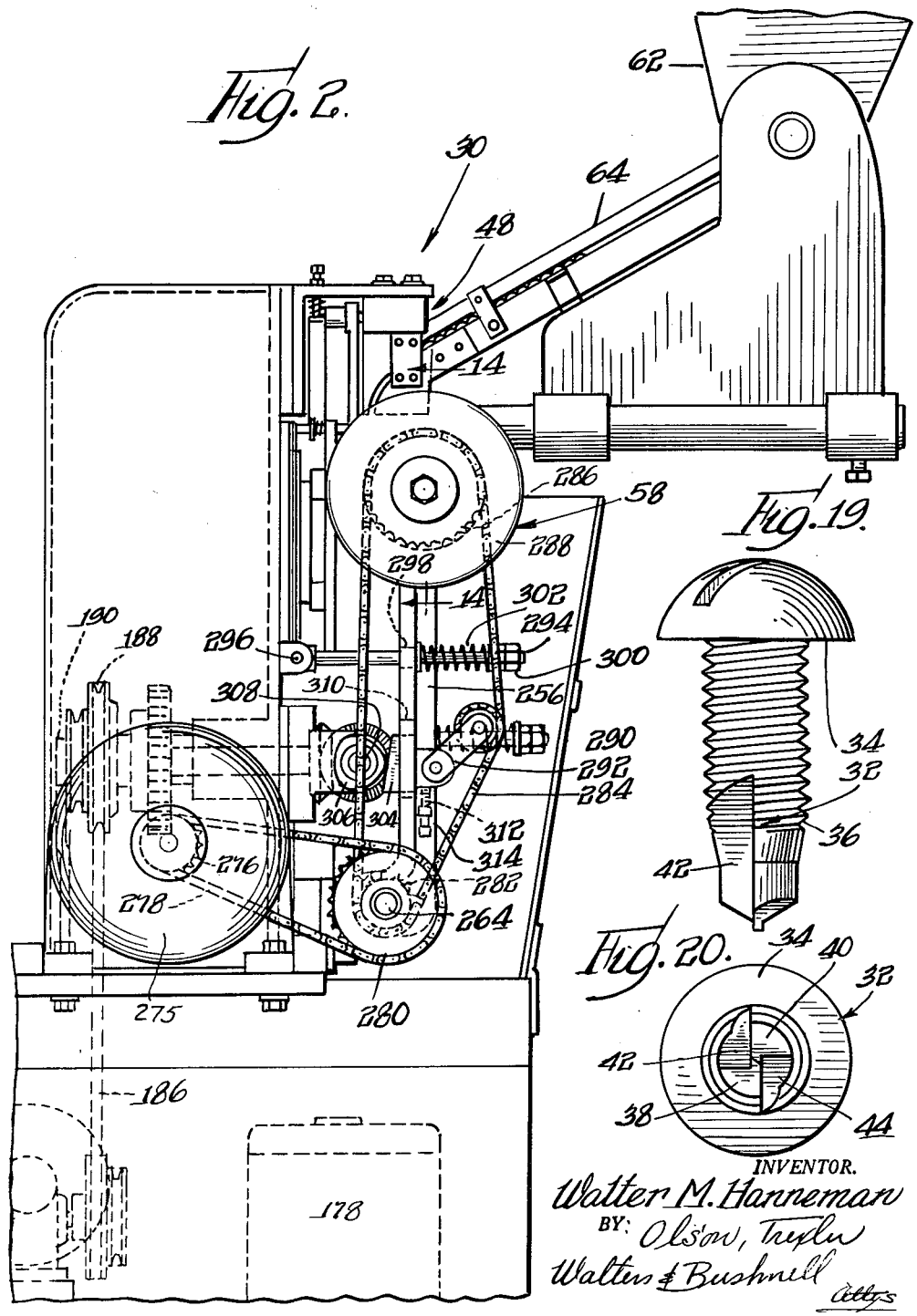

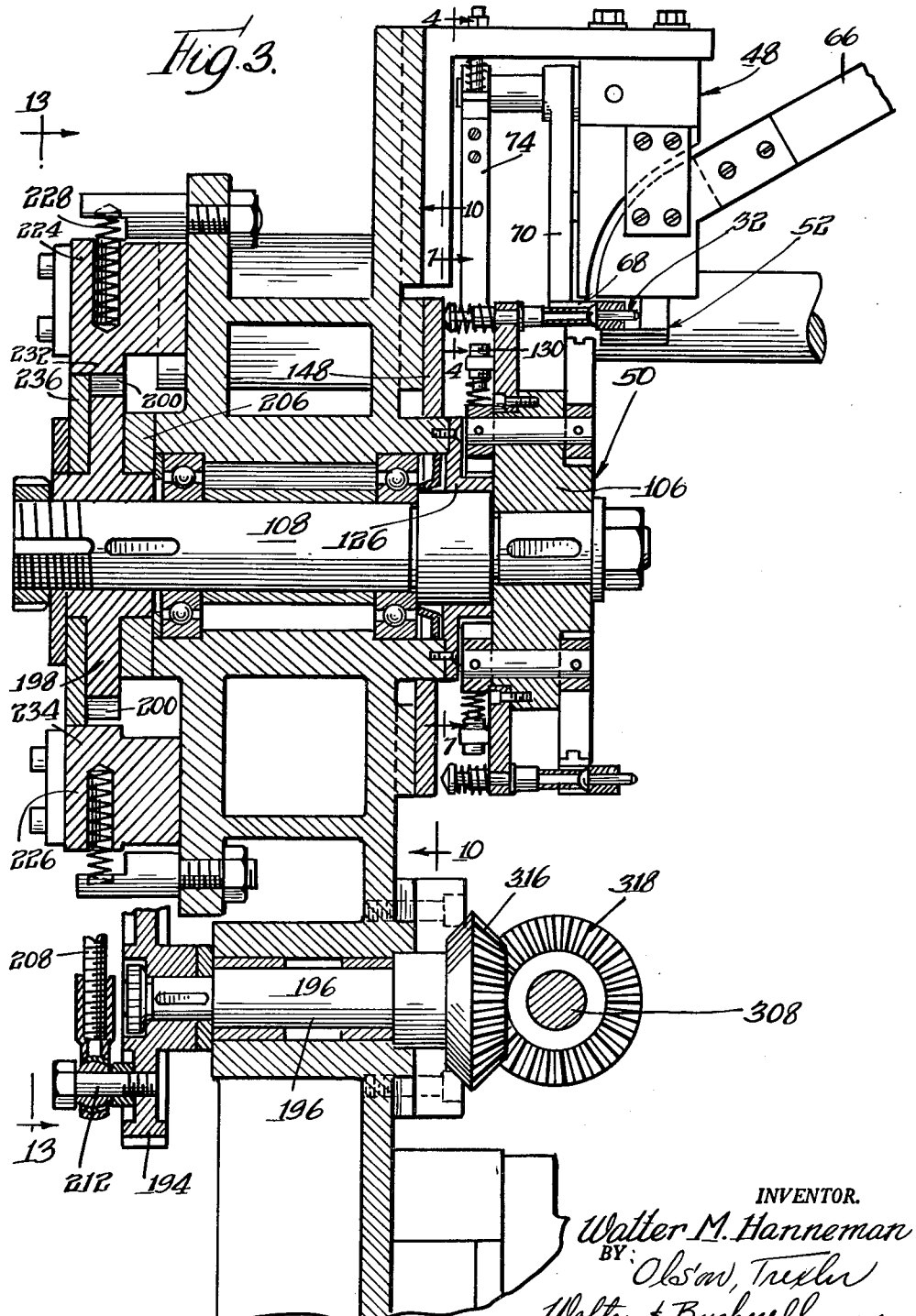

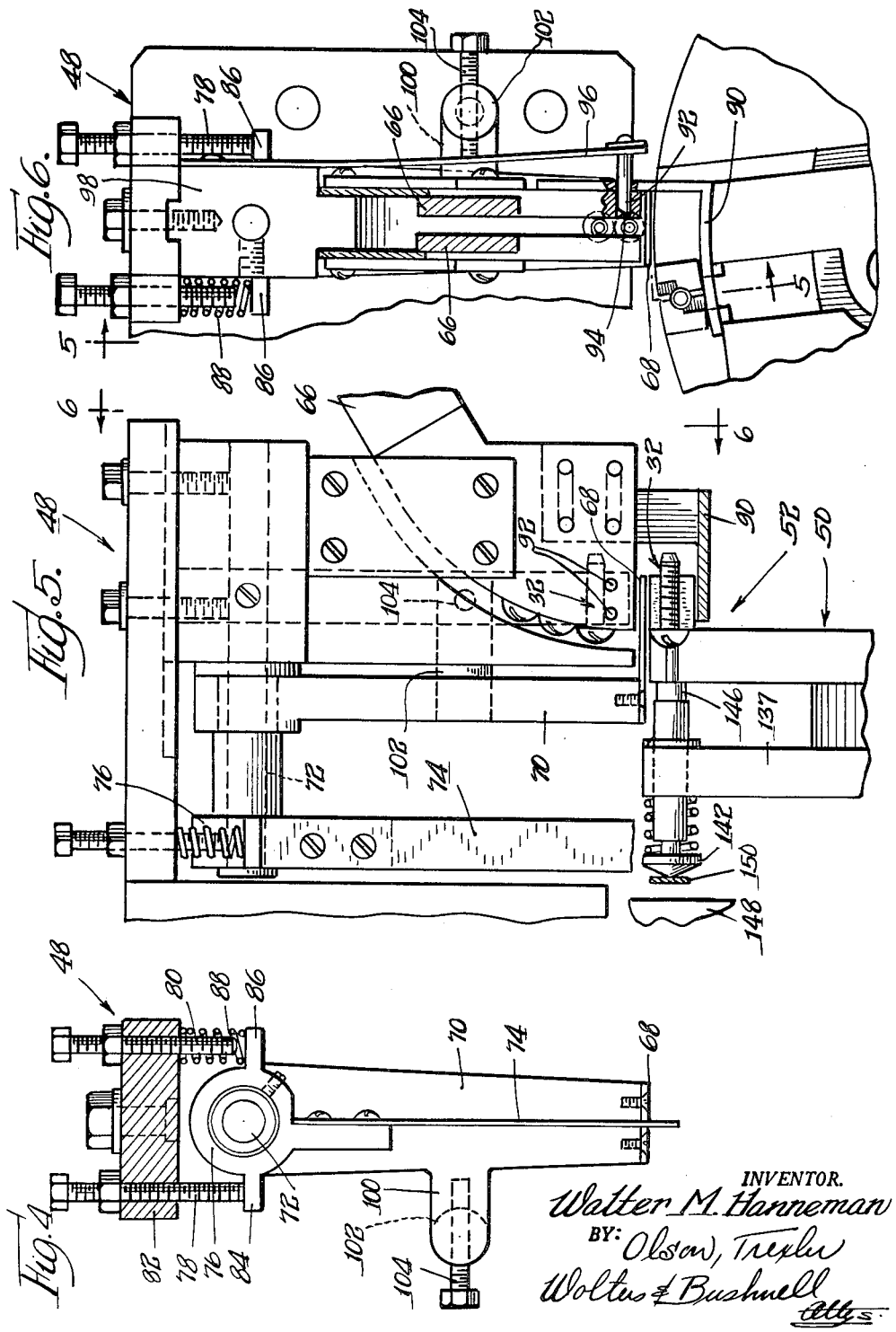

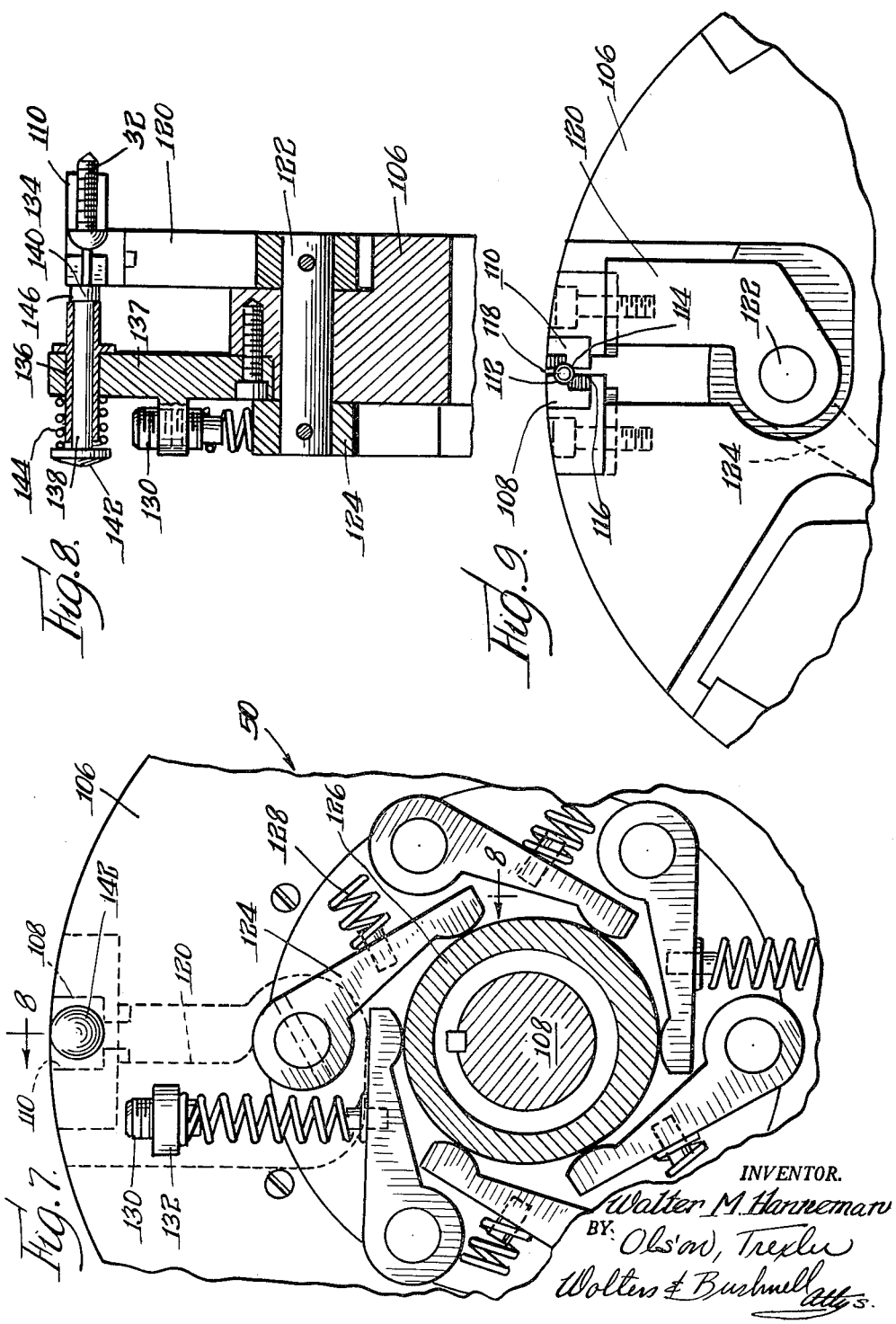

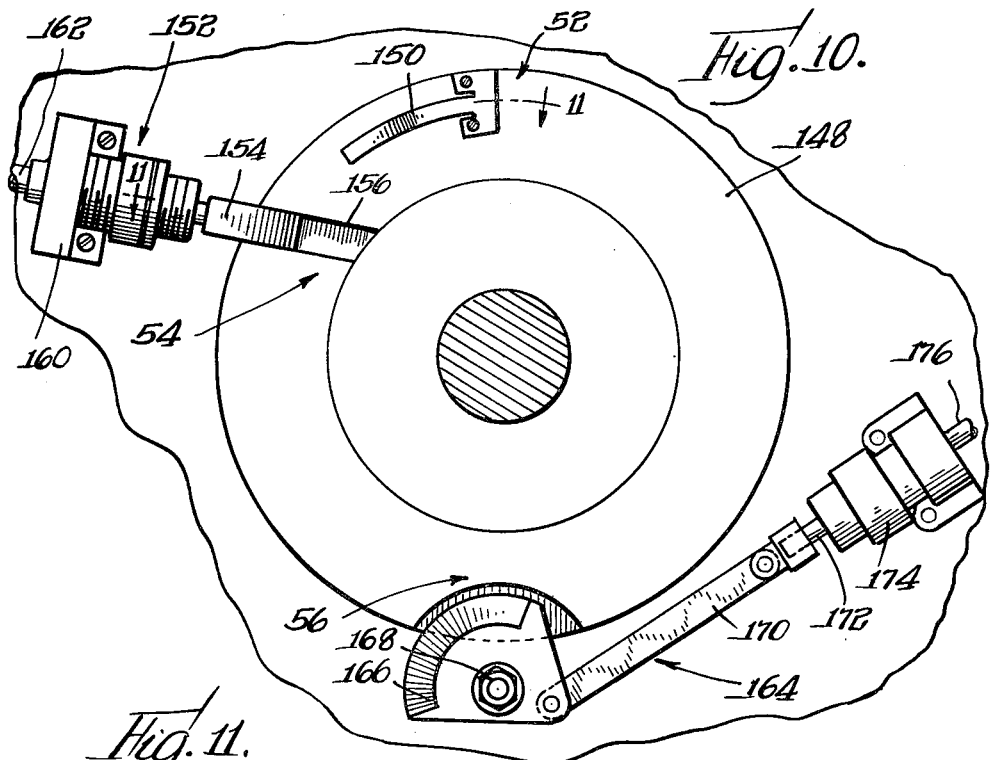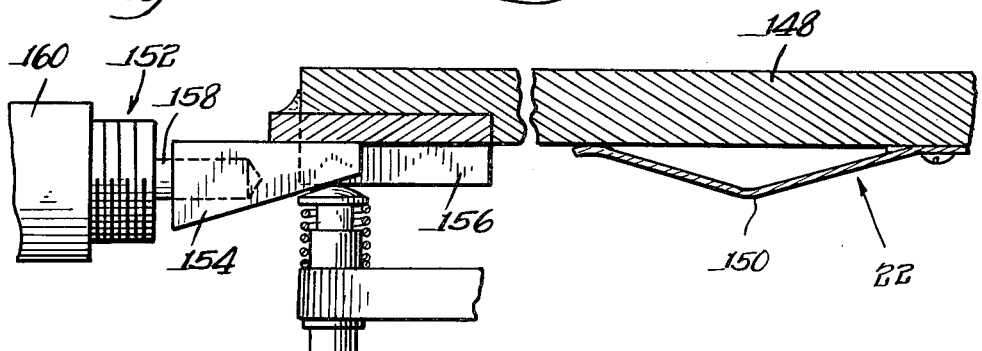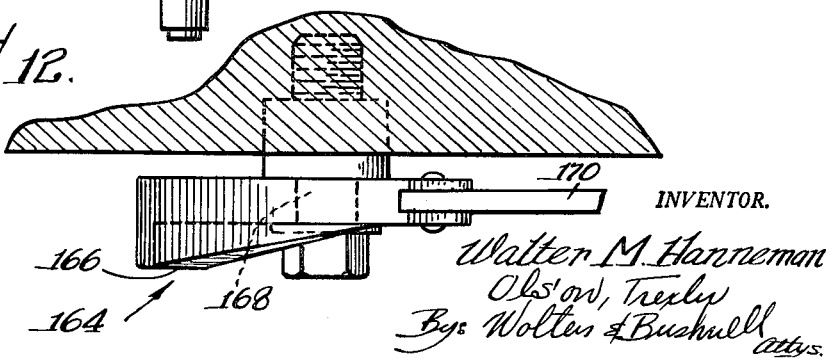

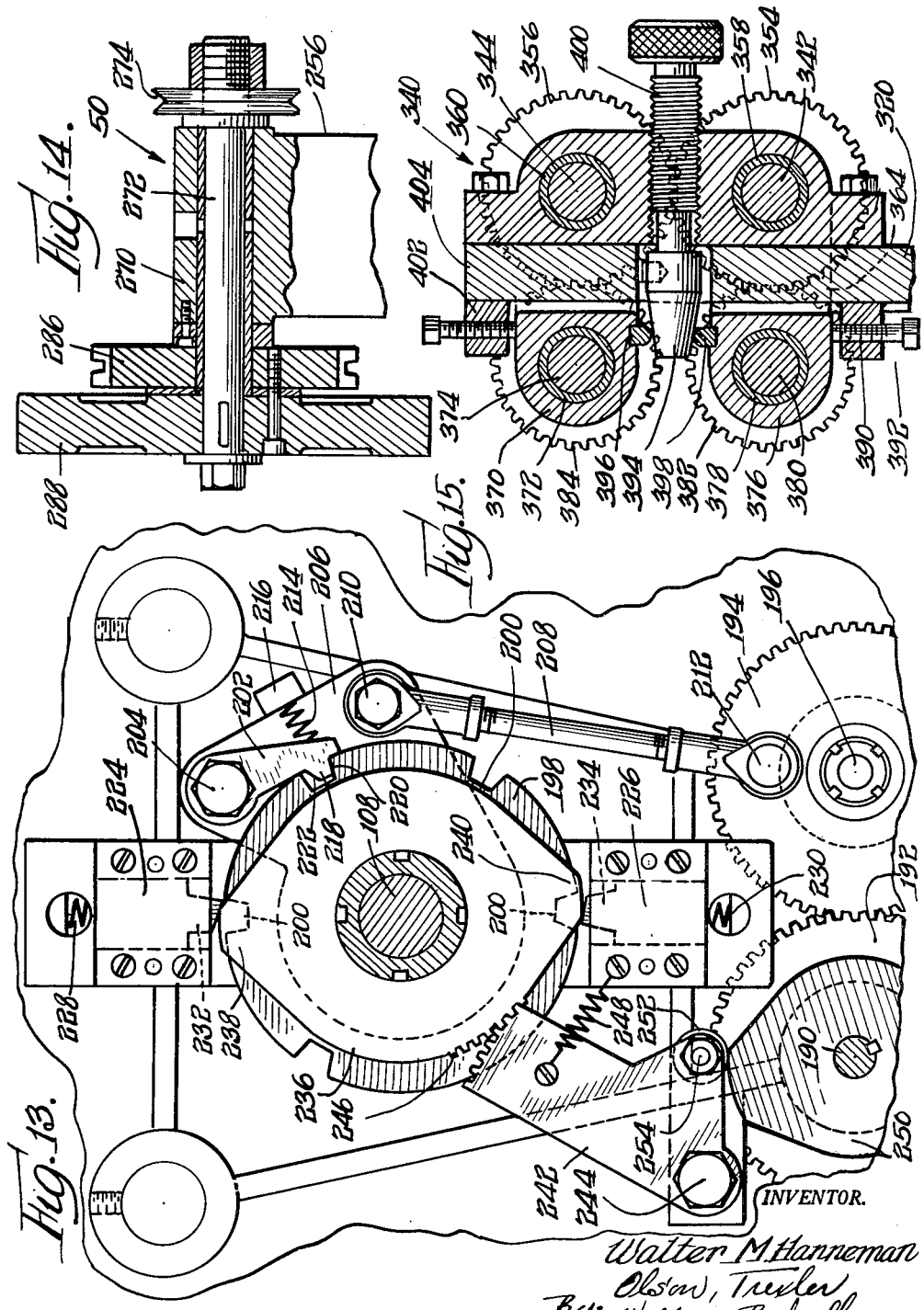

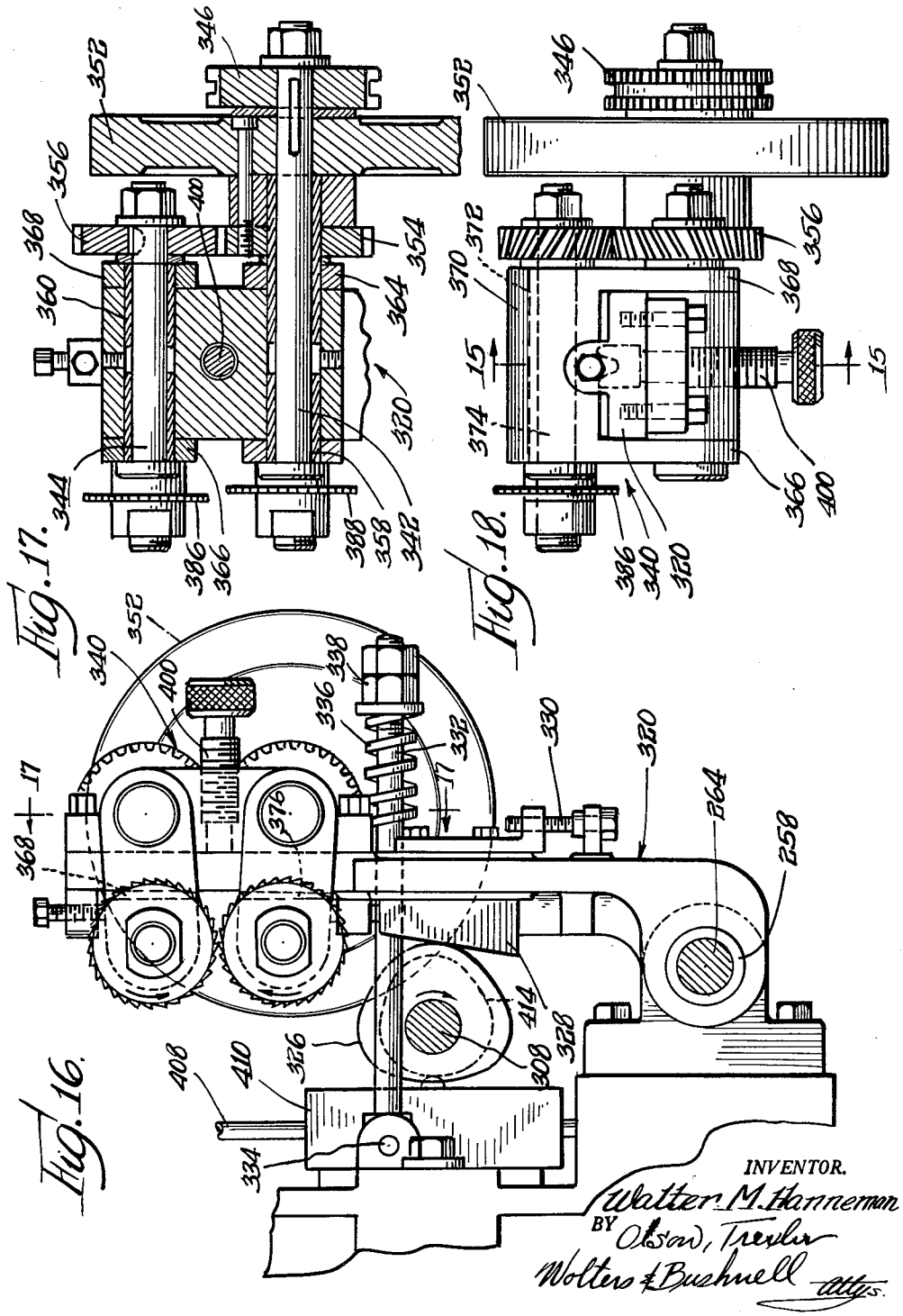

3,231,132
APPARATUS FOR FORMING DRILL POINT
THREAD CUTTING SCREW
Walter M. Hanneman, Annapolis, Md., assignor to Illinois
Tool Works Inc., Chicago, Ill., a corporation of
Delaware
Original application Oct. 14, 1959, Ser. No. 846,481, now
Patent No. 3,164,851, dated Jan. 12, 1965. Divided
and this application Sept. 24, 1964, Ser. No. 398,808
5 Claims. (Cl. 221—298)

This application is a division of my copending application, Ser. No. 846,481, filed October 14, 1959, now Patent No. 3,164,851.

The present invention relates to a novel apparatus for making screws, and more specifically to a novel apparatus for making drilling and thread cutting screws.

In order to enable screws of the type contemplated herein to be commercially successful, it is necessary that manufacturing costs be minimized while at the same time the screws must be accurately and properly formed. Therefore an important object of the present invention is to provide a novel apparatus capable of forming a drilling and thread cutting or tapping screw at high speed so as to minimize manufacturing costs.

A further object of the present invention is to provide a novel apparatus for forming drilling and tapping screws at high speeds or production rates, which apparatus is constructed so as to insure proper and accurate forming of the screws.

A more specific object of the present invention is to provide a novel apparatus of the above described type having means capable of receiving and intermittently advancing screws to various work stations and capable of positively retaining the screw at such work stations, and in a predetermined manner so as to enable the screws to be accurately formed.

A further specific object of the present invention is to provide a novel apparatus utilizing a plurality of rotary tools such as milling cutters, saws and the like for successively removing metal from screw blanks during high speed operations for forming the screws with drilling tips and thread cutting means.

Still another object of the present invention is to provide an apparatus of the above described type which is constructed so that it may be readily adapted or adjusted for varying cuts made in screw blanks.

A further object of the present invention is to provide an apparatus of the above described type which includes novel means for efficiently controlling and feeding screw blanks to additional means for feeding the blanks past the work stations.

A still further object of the present invention is to provide a novel apparatus of the above described type which is of efficient rugged construction which may be relatively economically produced and maintained.

Other objects and advantages of the present invention will become apparent from the following description and the accompanying drawings wherein:

FIG. 1 is a front elevational view showing an apparatus incorporating features of the present invention;

FIG. 2 is a fragmentary side elevational view of an apparatus incorporating features of the present invention;

FIG. 3 is an enlarged fragmentary partial sectional view taken generally along line 3—3 in FIG. 1;

FIG. 4 is a sectional view taken along line 4—4 in FIG. 3;

FIG. 5 is a sectional view taken generally along line 5—5 in FIG. 6;

FIG. 6 is a fragmentary sectional view taken along line 6—6 in FIG. 5;

FIG. 7 is a fragmentary sectional view taken generally along line 7—7 in FIG. 3;

FIG. 8 is a fragmentary sectional view taken along line 8—8 in FIG. 7;

FIG. 9 is a fragmentary front elevational view of the portion of the apparatus shown in FIG. 8;

FIG. 10 is a fragmentary sectional view taken generally along line 10—10 in FIG. 3;

FIG. 11 is an enlarged partial sectional view taken generally along line 11—11 in FIG. 10;

FIG. 12 is an enlarged fragmentary plan view, partially broken away, showing the cam means located in the lower portion of FIG. 10;

FIG. 13 is a fragmentary sectional view taken generally along line 13—13 in FIG. 3;

FIG. 14 is a fragmentary sectional view taken along line 14—14 in FIG. 2;

FIG. 15 is a fragmentary partial sectional view taken along line 15—15 in FIG. 18;

FIG. 16 is an enlarged fragmentary sectional view taken generally along the line 16—16 in FIG. 1;

FIG. 17 is a fragmentary sectional view taken generally along line 17—17 in FIG. 16;

FIG. 18 is a fragmentary plan view of the portion of the apparatus shown in FIG. 17;

FIG. 19 is a side elevational view of a screw which is to be formed by the apparatus of the present invention; and FIG. 20 is an entering end view of the screw.

Referring now more specifically to the drawings wherein like parts are designated by the same numerals throughout the various figures, an apparatus 30 shown in FIGS. 1 and 2 is constructed in accordance with the present invention for the purpose of producing screws such as the screw 32 shown in a finished condition in FIGS. 19 and 20. It suffices to state that the screw 32 comprises a head portion 34 having an elongated threaded shank 36 extending therefrom. The shank is provided with beveled end surfaces 38 and 40 which are formed by the means described in detail below, and longitudinally extending slots 42 and 44 are cut in opposite sides of the shank also by means described in detail below. Sides of these slots intersect the beveled end surfaces and peripheral surfaces of the shank for providing drilling and thread cutting edges on the screw. Reference is hereby made to my copending application Serial No. 240,181, filed November 26, 1962, now Patent No. 3,125,923 for additional details of the screw construction.

The apparatus 30 comprises a main frame structure 46 having a screw supply and feeding mechanism 48 mounted at an upper end thereof, which mechanism is shown in FIGS. 1–6. Turret or endless conveyor means 50 and certain parts thereof are shown best in FIGS. 1, 3, 7–9 and 13.

The screw feeding or loading station is disposed at the area designated by the numeral 52 in FIGS. 1, 3 and 10, and first and second work stations 54 and 56 are spaced around the endless path of travel of the indexing head or turret means 50 as shown best in FIGS. 1 and 10. A mechanism 58 is mounted on the main frame structure 46 for working the ends of successive screw blanks at the work station 54 for forming the beveled end surfaces 38 and 40, which mechanism is shown in whole or in part in FIGS. 1, 2 and 14. Another mechanism 60 shown best in FIGS. 1 and 15–18 is provided for forming the slots 42 and 44 in successive screw blanks at the work station 56 in the manner which will be described in detail below.

As shown in FIG. 2, the supply and feeding mechanism comprises a suitably supported hopper 62 from which a downwardly inclined chute 64 extends. The chute is constructed so as to direct screw blanks, preferably having threads formed on the shanks thereof, in single file relationship to the loading station. More specifically, the chute comprises a pair of rails 66 on which the heads of the screws slide and between which the shanks of the screws depend. As shown best in FIGS. 3 and 5, lower end portions of the rails 66 are curved so that the screws assume a substantially horizontal position as they approach the lowermost end of the chute.

The feeding mechanism 48 is provided with means shown best in FIGS. 3–6 for delivering successive screws, one at a time, to the indexing turret or head means 50. More specifically, the lower end of the chute structure 64 is normally closed by a plate 68 secured to the lower end of an arm 70 which in turn is fixed to and depends from a rock shaft 72 intermittently actuated so as to shift the restraining plate 68 to permit a screw blank to fall by gravity to the indexing head or turret 50. This operation of the rock shaft is accomplished by means of a leaf spring 74 fixed to and depending from a hub member 76 which in turn is fixed to the rock shaft. The leaf spring 74 is in turn adapted to be engaged and actuated by an element of the indexing head or turret means 50 which will be described below. It suffices to state at this point that the indexing head or turret means includes a portion engageable with the lower end of the leaf spring 74 during the indexing movement of the head so that the leaf spring and rock shaft are actuated in a counterclockwise direction as viewed in FIG. 4 during indexing movement of the head or turret means 50. Adjustable stop screws 78 and 80 extend from a fixed frame or support member 82 and are engageable with abutments or shoulder elements 84 and 86 extending from the hub member 76 for the purposes of limiting rocking movement of the shaft 72 in opposite directions. A compression spring 88 extends between the support member 82 and the abutment 86 for returning the rock shaft to its initial position and thereby returning the closure or screw retaining plate 68 to the chute closing position.

A fixed stop plate 90 is mounted beneath the end of the chute at the loading station and beneath elements of the indexing head or turret means 50 which will be desribed in detail below, which stop plate serves to prevent a screw from passing completely through the gripping elements of the indexing head until such elements have had an opportunity to engage the screw.

In order to enable only one screw at a time to pass from the lower end of the chute, pins 92 shiftably project through suitable apertures in one of the guide members 66 for entering between the lowermost screw and the immediately adjacent screw when the plate member 68 is shifted to release the lowermost screw. Preferably the pins 92 are provided with pointed and upwardly beveled ends 94 as shown best in FIG. 6 for facilitating entry of the pins between adjacent screws. The pins 92 are fixed to the lower end of a leaf spring 96 which has its upper end fixed to a block member 98 which forms a part of the frame or support structure for the mechanism 48. The leaf spring 96 is formed so that it normally assumes the position shown in FIG. 6 in which the pins are retracted from the space between the guide member 66 in order to permit the screws to advance toward the closure or retaining plate 68. Generally L-shaped bracket means 100 is fixed to the arm 70 and includes a leg portion 102 which extends in overlying relationship with respect to the leaf spring 96. An abutment element 104 which is preferably in the form of an adjustable screw is carried by the bracket leg portion 102 for engagement with the leaf spring 96. With this arrangement, the screw or abutment element 104 engages the leaf spring 96 so as to advance the pins 92 between adjacent screws when the arm 70 is rocked so as to shift the closure plate 68 sufficiently to permit the lowermost screw to fall to the indexing head or turret means 50. It will be appreciated that when the arm 70 returns to its normal position, the abutment element 104 will release the leaf spring 96 sufficiently to permit the pins 92 to be retracted so that the next screw element may drop to the plate member 68.

The indexing head or turret means 50 is shown in FIGS. 1, 3, and 7–13 and comprises a head member 106 fixed on a rotatably supported shaft 108. A plurality of pairs of fixed and movable cooperable jaw elements or members 108 and 110 are equally spaced around the periphery of the head member 106. As indicated best in FIGS. 8 and 9, the jaw members have portions projecting forwardly of the face of the rotary head member 106 for gripping the shanks of screws 32, and the jaw members are relieved for accommodating the head portions of the screws. It will be noted that the lengths of the projecting portions of the jaw members are substantially less than the length of the screw shank so that the free end portion of the screw shank will be presented for engagement by a rotary tool in the manner described in detail below. It is also to be noted that, as shown best in FIG. 9, screw engageable seat portions 112 and 114 of each pair of cooperable jaw members 108 and 110 oppose each other in a direction disposed at a substantial angle to a radial line extending from the center of the rotary head through the axis of a screw shank held between the jaw members. In addition the jaw members are relieved at opposite sides of the screw shank engageable portions 112 and 114 so as to provide slots 116 and 118 generally parallel to the screw shank axis and oppositely offset with respect to the screw shank axis for exposing portions of the screw shank for engagement by tools or saws used to cut the slots 42 and 44 in the screw shank as will be set forth in detail below.

As is apparent from the drawings, the various pairs of fixed and movable jaw members and the actuating means therefore are identical. Thus, each movable jaw member 110 is secured to an outer end of an arm 120 which in turn is fixed to a shaft 122 rotatably mounted in the head member 106. Each shaft 122 extends through the head member 106 and has a cam follower or lever arm 124 pinned or otherwise secured to its inner end and disposed for engaging the peripheral surface of a cam member 126 which is fixed around the main shaft 108 as shown in FIGS. 3 and 7. Compression springs 128 are arranged between the cam follower or lever arms 124 and adjustable abutment elements or screws 130 mounted in lugs 132 fixed to the back of the head member 106. It will be appreciated that the springs serve to maintain the cam follower arms in engagement with the surface of the cam 126. The cam surface is formed so that each movable jaw element will be open as it approaches the loading station 52 and will then be closed for retaining a screw as the head member is indexed for advancing successive jaw members and screws therebetween to the work stations.

In order to insure proper positioning of a screw between each pair of cooperable jaw members so that an end portion of the screw shank is correctly exposed, means is provided in association with each pair of jaw members for axially engaging a head portion of a screw and axially shifting the screw, if necessary, until the head portion thereof engages end or stop surfaces 134 of the jaw members as shown in FIG. 8, which stop surfaces are provided by the screw head accommodating recesses at the inner ends of the jaw members. Thus a plurality of guide sleeves 136 are mounted on and spaced around a back up or support plate 137 which forms a part of the indexing head means, and each of the guide sleeves 136 is axially aligned with a pair of the screw gripping members. A pressure pin 138 is slidably mounted in each of the guide sleeves 136. An end portion 140 of each pin is adapted to engage a head portion of a screw held between the associated pair of gripping members, and an opposite end portion of each pin is provided with an enlarged head 142. A compression spring 144 is provided between the enlarged head 142 of each pin 138 and the supporting plate for normally maintaining the pins in retracted positions. An annular enlargement or collar 146 is disposed on each of the pins for limiting rearward movement of the pins under the influence of the springs. As shown in FIGS. 3, 4 and 5, the projecting pins 138 and springs 144 thereon are located for engaging and actuating the leaf spring 74 of the screw blank feeding mechanism 48 in the manner described above.

A fixed annular plate member 148 shown in FIGS. 3, 10 and 11 is mounted directly behind the indexing head or turret means 106. An inclined leaf spring 150 is arcuately disposed on the plate member 148 so that it extends from the loading station 52 toward the first work station 54. The spring 150 is adapted to engage heads of successive pressure pins 138 so that as each successive pair of cooperable jaw members progressively close upon and grip the shank of a screw, the associated pressure pin will be actuated by the spring 150 for axially shifting the screw and positioning the screw head against the end or stop surfaces 134 of the jaw members.

While the spring 150 serves to actuate pressure pins to accomplish initial proper positioning of the screws, means 152 shown in FIGS. 10 and 11 is provided at the work station 54 for positively rather than yieldably engaging the pressure pins and thus securely clamping the screws against axial displacement while they are being worked upon at the station 54. The means 152 comprises a wedge 154 slidably disposed in a suitable guideway 156 formed on the plate member 148 so that when the wedge 154 is extended it will engage and axially shift a pressure pin 138 located at the work station 54, and when the wedge is retracted the pressure pin is released to permit free and indexing movement of the head or turret structure 106. Any suitable means may be provided for actuating the wedge 154. For example the wedge may be secured to an end of a piston rod 158 which is actuated for extending the wedge by an air cylinder 160 and which may be returned by suitable spring means within the cylinder. The air cylinder will, of course, be connected with a suitable source of air under pressure by a conduit 162 as indicated in FIG. 10.

Means 164 is also provided at the work station 56 for engaging a pressure pin and clamping a screw during a slot cutting operation at the work station 56. The means 164 includes an arcuate cam member 166 pivotally mounted on a shaft 168. A rigid link 170 is pivotally connected to the arcuate wedge member and to an outer end of a piston rod 172 which is actuated by an air cylinder 174 also suitably connected to a source of air under pressure, not shown, by conduit 176. The air cylinder is preferably provided with internal spring means for returning the piston and the arcuate cam or wedge member to retracted positions. It will be appreciated that suitable valve and control means are provided for actuating the air cylinders 160 and 174 and the wedge elements operated thereby in proper timed relationship with other elements of the apparatus.

The means for driving and intermittently indexing the head or turret structure 106 is shown in FIGS. 1–3 and 13. This means comprises an electric motor or other suitable prime mover 178 mounted in the lower portion of the main frame structure 46 and adapted to drive a shaft 180 through suitable gearing means 182. A pulley 184 on the shaft 180 drives a belt 186 which in turn extends around and drives a pulley 188 on a shaft 190. The shaft 190, as shown best in FIG. 13, carries a gear 192 which meshes with and drives an identical gear 194 fixed on a shaft 196 rotatably supported adjacent and parallel to the shaft 190. An indexing plate or ratchet wheel 198 is fixed on the shaft 108 and is provided with a plurality of equally spaced peripheral notches 200 which are equal in number to and axially aligned with the pairs of screw gripping jaws on the head structure 106. In order to actuate the indexing plate 198 and thus index the head structure 106, a pall 202 is pivotally mounted as at 204 on a carrier plate 206 for engagement in the notches 200. The plate 206 is pivotally mounted for oscillating movement around the axis of the shaft 108, and the plate 206 is adapted to be oscillated by means of a connecting rod 208 which is pivotally connected to the plate 206 by pin 210 and which is also pivotally connected to a pin 212 eccentrically fixed to the gear 194. A compression spring 214 is provided between the pall 202 and an abutment 216 fixed to the oscillating plate 206 for urging the pall for engagement in the notches 200. The pall is provided with a projection 218 adapted to enter the notches 200, which projection includes an abutment surface 220 facing in a clockwise direction as viewed in FIG. 13 and parallel to an opposing face of a notch in which the projection is disposed for providing a driving connection between the pall and the indexing plate or ratchet wheel. The projection 218 also comprises a generally rearwardly facing inclined cam surface 222 for urging the pall outwardly to disengage the projection from a notch when the carrier plate 206 is oscillated in a counterclockwise direction as viewed in FIG. 13.

The connecting rod 208 and associated elements of the indexing means are constructed and adjustable so that the head structure 106 will be accurately advanced during each movement thereof for properly positioning the pairs of jaw members at the various stations. However, in order to insure proper positioning of the jaw members at the various stations and also to insure that the jaw members will remain properly positioned during working operation in order to permit the screws to be properly and accurately formed, means is provided for releasably but positively locking the indexing plate or ratchet wheel 198 during the interval between the intermittent movement thereof. This means comprises reciprocably and slidably mounted dogs or plungers 224 and 226 arranged in opposing relationship adjacent opposite peripheral portions of the indexing plate 198. Compression springs 228 and 230 are provided for biasing the dogs for engagement with the indexing plate 198, and the dogs respectively include wedge shaped projecting portions 232 and 234 having opposite side surfaces inclined in the same manner as the opposite side surfaces of the notches 200 and adapted to mate with the notches 200 for positively locking the indexing plate 198 when the dog portions 232 and 234 enter a pair of oppositely disposed notches. With the parts in the positions shown in FIG. 13, the dogs have been shifted outwardly or to retracted positions so that they are disengaged from the notches, and the pall 202 is in position to initiate indexing movement of the plate member or ratchet wheel 198. In order to control the dogs 224 and 226, a cam plate 236 is freely pivotally supported on a hub portion of the indexing plate 198 as shown in FIGS. 3 and 13. The dogs 224 and 226 have a width greater than the thickness of the indexing plate 198 so that they overlie the cam plate 236 in the manner shown best in FIG. 3. The cam plate 236 is formed with a pair of oppositely disposed lobes 238 and 240 which are adapted to shift the dogs from the slot 200 when the cam plate 236 is turned to the position shown in FIG. 13 and also adapted to permit the dogs to enter the slot 200 and lockingly engage the indexing plate 198 when the cam plate 236 is turned in a counterclockwise direction as viewed in FIG. 13. In order to oscillate the cam plate 236 in proper timed relationship with the indexing pall 202, a gear sector 242 pivotally mounted by a pin 244 meshes with a segment of gear teeth 246 formed on the cam plate 236. A tension spring 248 is connected between the gear sector 242 and a fixed part of the frame structure for driving the gear sector 242 in a clockwise direction as viewed in FIG. 13 for turning the cam plate 236 in a manner which permits the dogs to enter the notches 200. In order to turn the gear sector 242 in the opposite direction for causing the cam member 236 to raise or retract the dogs, an eccentric cam 250 is fixed to and driven by the shaft 190 and engages a roller or cam follower 252 mounted on a pin or stub shaft 254 secured to the gear sector 242.

The mechanism 58 for milling the beveled end surfaces on the ends of the screw shanks at the work station 54 comprises a generally upstanding bracket 256 shown in FIGS. 1, 2 and 14. A lower end portion of the bracket 256 is freely pivotally mounted on a bearing sleeve 258 which in turn is journalled in blocks 260 and 262. The sleeve also rotatably supports a drive shaft 264 therein. As shown in FIG. 1, the lower end of the bracket 256 includes bearing portions 266 and 268 which surround the bearing sleeve 258. The upper end of the bracket 256 is provided with a bearing portion 270 in which is journalled a shaft 272. A milling cutter 274 is fixed on one end of the shaft 272, which milling cutter includes generally V-shaped cutting edge means as shown in FIG. 14 so that the cutter is adapted to form the beveled surfaces 38 and 40 on the ends of the screw shanks at the work station 54.

An electric motor 275 is mounted on the main frame structure 46 for providing power for driving the milling cutter spindle or shaft 272 and for actuating certain other portions of the apparatus as is described in detail below. More specifically, as shown in FIGS. 1 and 2, the motor 274 drives the shaft 264 by means of a sprocket wheel 276 secured to the rotor shaft and driving a chain 278 which encircles a larger sprocket wheel 280 fixed on the shaft 264. Another sprocket wheel 282 fixed on the shaft 264 drives an endless chain 284 which in turn drives a sprocket wheel 286 fixed on the milling cutter spindle or shaft 272. Preferably a fly wheel 288 is also fixed on the milling cutter shaft and idler sprocket 290 is carried by a lever 292 pivotally supported on the bracket 256 for maintaining the desired tension in the chain 284.

In order to pivot or oscillate the bracket 256 for moving the milling cutter 274 into and out of engagement with the end of a screw shank at the work station 54, spring means is provided for biasing the bracket in a counterclockwise direction and toward the work piece as viewed in FIG. 2 and cam means is provided for shifting the bracket 256 in a clockwise direction and away from the work piece. More specifically, a bolt 294 is pivotally connected to the main frame structure at 296 (see FIG. 2) and extends through an oversized aperture 298 in the bracket 256. A nut or other suitable abutment means 300 is fixed on the outer end of the bolt 294, and a compression spring 302 is disposed on the bolt between the nut member and the bracket 256 for biasing the bracket and the milling cutter toward the work piece.

An inclined cam follower or block 304 is mounted on the bracket 256 for engaging an eccentric rotary cam 306 fixed on a rotatably mounted cam shaft 308 as shown in FIG. 2. The cam 306 is formed so that as it is rotated it alternately forces the bracket 256 outwardly or in a clockwise direction and permits the spring 302 to return the bracket 256 toward the work. As indicated in FIGS. 1 and 2, the cam follower or block 304 is slidably mounted in an elongated vertical slot 310 in the bracket 256, and an adjustment screw 312 is threaded into an outwardly projecting portion of the cam block 304 and extends rotatably through an aperture in a lug 314 fixed on the bracket 256. The screw 312 is axially fixed with respect to the lug 314 so that upon rotation of the screw, the block 304 may be vertically adjusted. It will be appreciated that such adjustment may be used to vary the limit of movement of the milling cutter 274 toward the work piece or screw at the work station 54. Thus the apparatus may be readily adjusted for accommodating screws of different lengths.

The cam shaft 308 is driven from the above described shaft 196 so as to actuate the milling cutter bracket 256 in timed relationship with the indexing turret or head structure 106. Thus, as indicated in FIG. 1, a beveled gear 316 is fixed on a forwardly projecting end of the shaft 196, which gear meshes with a second bevel gear 318 fixed on the cam shaft 308.

The mechanism 60 shown in FIGS. 1 and 15–18 includes a generally upstanding bracket 320 which is somewhat similar to but shorter than the bracket 256. The bracket 320 is provided with bearing portions 322 and 324 at its lower end, which bearing portions are also pivotally supported on the elongated bearing sleeve 258. Means are provided for actuating or pivoting the sleeve 320 toward and away from the work at the station 56, which means are essentially identical to the corresponding means which actuate the above described milling cutter 274. Thus, as shown best in FIG. 16, an eccentric cam 326 is fixed on the cam shaft 308 for engaging an inclined adjustable cam follower or block 328 which may be vertically adjusted by a screw 330. The cam 326 is formed so as to shift the bracket 320 away from the work piece or screw at the station 56. A bolt 332 is pivotally connected to the main frame structure at 334 and extends through an oversized aperture in the bracket 320. A compression spring 336 is clamped between the bracket and nut or abutment means 338 on the outer end of the bolt for yieldably biasing the bracket toward the work piece at the work station 56.

The bracket 320 carries a double saw assembly 340 at its upper end for cutting the opposite side slots 42 and 44 in the side of a screw shank at the work station 56. The double saw assembly 340 which is shown in FIGS. 1 and 15–18 comprises first and second parallel and vertically spaced apart shafts 342 and 344 rotatably journalled in an upper end portion of the bracket 320. The shaft 342 has a sprocket 346 secured to one end thereof, which sprocket is driven by an endless chain 348 which encircles another sprocket 350 fixed on the above described shaft 258 which is driven from the motor 275. Preferably a fly wheel 352 is fixed on the shaft 342. A gear 354 is also fixed on and driven by the shaft 342, which gear meshes with and drives another gear 356 mounted on the shaft 344. Bearing sleeves 358 and 360 are respectively disposed over the shafts 342 and 344, and pairs of links 362–364 and 366–368 are respectively pivotally mounted on the sleeves 358 and 360. As shown in FIG. 15, the links 366 and 368 are integrally joined to a tubular bearing block 370 having the bearing sleeve 372 mounted therein and in which a shaft 374 is journalled. The links 362 and 364 are similarly integrally joined with opposite end portions of a tubular bearing block 376 (see FIGS. 15 and 16). A bearing sleeve 378 is mounted within the tubular portion 376 and rotatably supports a shaft 380. Gears 382 and 384 are respectively mounted on and fixed to first end portions of the shafts 380 and 374 and mesh with and are driven by the gears 354 and 356. Opposite end portions of the shafts 374 and 380 respectively carry rotary cutting tools or saws 386 and 388 which are, of course, fixed with respect to and driven by the shafts. The saws 386 and 388 are axially offset with respect to each other as shown best in FIG. 17 for forming the offset slots 42 and 44 in the sides of the screw shank described above.

At this point it may be noted that the planes of rotation of the milling cutter 274 and the saws 386 and 388 are parallel to each other. It is further to be noted that, as described more fully in the above mentioned copending application, the ridge line between the beveled end surfaces 38 and 40 at the end of the screw shank is disposed at an angle to the sides of the slots 42 and 44 which intersect the peripheral surface of the shank to provide cutting edges. This structure of the screw is obtained by angularly displacing the working stations 54 and 56 around the circular path of travel of the screws on the head or turret structure 106 an amount in accordance with the angle between the ridge line and the groove side surfaces which is to be obtained. This enables the apparatus to utilize the simplified structure resulting from the fact that all of the rotary tools or cutters are rotated and oscillated in parallel planes.

The saws 386 and 388 are supported so that they may be adjusted toward and away from each other for enabling the apparatus to accommodate screw shanks of different diameters. Thus as indicated above, the links carrying the bearing means for the saw shafts 374 and 380 are pivotally mounted on the bearing sleeves 360 and 358 respectively. The bearing block 376 and thus the saw 388 are adjustably supported and positioned by means of a stop screw 390 threaded through a lug 392 projecting from the bracket 320 and beneath the bearing block 376. The upper bearing block 370 is supported, as shown best in FIG. 15, by an adjustable wedge member 394 which projects between the bearing blocks 370 and 376. Accurately formed and positioned stop or abutment elements 396 and 398 are fixed on the bearing blocks 370 and 376 for engagement with the double sided wedge element 394 so that the saws may be accurately positioned and adjusted with respect to each other upon axial adjustment of the wedge element 394. Such axial adjustment is accomplished by means of a screw 400 threaded through a suitable aperture formed in the upper end portion of the bracket 320 and having a rotary connection with the wedge element 394. As will be understood, when the wedge element 394 is adjusted, the screw 390 is also adjusted so that the bearing block 376 is held in a position with the abutment element 398 in engagement with the wedge element. In addition another set screw 402 extends through an internally threaded aperture 404 in a lug projecting from the bracket 320 for engagement with the bearing block 370 so as to maintain the abutment or stop element 396 in engagement with the wedge element.

The apparatus is provided with a discharge station 406 which, as indicated in FIG. 1, is diametrically opposite from the first work station 54. The gripping jaw member controlling cam 126 is formed so that successive finished screws are released by the jaws at the station 406. In order to aid in the discharge of the screws from the indexing head or turret structure 106, a conduit 408 is positioned for directing an air blast against the released screws at the discharged station. The conduit 408 is connected with a control valve 410 which has an inlet port connected with a suitable source of air under pressure, not shown, by a conduit 412. The valve 410 which may be of any suitable two-position spring closed construction is adapted to be opened in proper timed relationship with the remainder of the apparatus by a cam 414 fixed on the cam shaft 308 (see FIGS. 1 and 16). The outlet port of the valve 410 may also be connected with the above described air cylinders 160 and 174 for controlling the clamping of the screws during the working operations.

While the preferred embodiment of the present invention has been shown and described herein, it is obvious that many structural details may be changed without departing from the spirit and scope of the appended claims.

I claim:

1. In an apparatus of the type described including means for conveying successive screws from a loading station along a predetermined path of travel; a combination comprising of a mechanism disposed adjacent said loading station for feeding screws to the conveying means, said mechanism comprising chute means extending downwardly and having a lower end disposed adjacent said conveying means, a rock shaft pivotally mounted adjacent said chute means, a plate member carried by said shaft and normally closing the lower end of said chute means for supporting a lowermost screw in the chute means, an element shiftably mounted for movement from a retracted position to an extended position in said chute means and between a lowermost screw and an immediately adjacent screw in the chute means, means independent of said shaft for normally yieldably biasing said element toward and retaining said element in the retracted position, and means interconnected with said shaft for positively shifting said element to said extended position when the shaft is rotated to shift said plate member to open the lower end of said chute means to permit the lowermost screw to fall through the conveying means so that said element serves to retain the remaining screws in the chute means.

2. The combination, as defined in claim 1, wherein said means for retaining said element in the retracted position comprises a fixed leaf spring which is connected to and supports said element.

3. The combination, as defined in claim 1, which comprises a member secured to and projecting from said rock shaft for engagement with projection means on said conveying means for actuating the rock shaft in timed relationship with the conveying means.

4. The combination, as defined in claim 3, wherein said last mentioned member comprises a leaf spring.

5. In an apparatus of the type described including means for conveying successive screws from a loading station along a predetermined path of travel; a combination comprising of a mechanism disposed adjacent said loading station for feeding screws to the conveying means, said mechanism comprising chute means extending downwardly and having a lower end disposed adjacent said conveying means, a rock shaft pivotally mounted adjacent said chute means, a member carried by said shaft and normally closing a lower end portion of said chute means for supporting a lowermost screw in the chute means, an element shiftably mounted for movement from a retracted position to an extended position in said chute means and between a lowermost screw and an immediately adjacent screw in the chute means, means for normally retaining said element in the retracted position, means interconnected with said shaft for shifting said element to said extended position when the shaft is rotated to shift said member to open the lower end portion of the chute means to permit the lowermost screw to fall to the conveying means so that said element serves to retain the remaining screws in the chute means, and a leaf spring member secured to and projecting from said rock shaft for engagement with projection means on said conveying means for actuating the rock shaft in timed relationship with the conveying means.

References Cited by the Examiner

UNITED STATES PATENTS

| | | | |
|---|---|---|---|
| 898,765 | 9/1908 | Morris | 221—298 |
| 1,904,493 | 4/1933 | Mathias | 221—290 |
| 2,433,076 | 12/1947 | Weckstein | 221—290 |
| 2,485,062 | 10/1949 | Newton | 221—290 |
| 2,604,577 | 7/1952 | Strickland et al. | 221—290 |
| 3,048,281 | 8/1962 | Godfrey. | |
| 3,124,255 | 3/1964 | Springate. | |

LOUIS J. DEMBO, *Primary Examiner.*

SAMUEL F. COLEMAN, WALTER SOBIN,
*Examiners.*